United States Patent [19]
Cariveau et al.

[11] Patent Number: 5,868,502
[45] Date of Patent: Feb. 9, 1999

[54] THRUST DISC BEARINGS FOR ROTARY CONE AIR BITS

[75] Inventors: Peter T. Cariveau, Stillwater; Robert Wagoner, Ponca City, both of Okla.

[73] Assignee: Smith International, Inc., Houston, Tex.

[21] Appl. No.: 835,285

[22] Filed: Apr. 9, 1997

Related U.S. Application Data

[63] Continuation-in-part of Ser. No. 622,646, Mar. 26, 1996, Pat. No. 5,642,942.

[51] Int. Cl.$^6$ ..................................................... F16C 33/00
[52] U.S. Cl. ................................................ 384/93; 384/95
[58] Field of Search .................................. 384/92, 93, 95, 384/96, 907.1

[56] References Cited

U.S. PATENT DOCUMENTS

| | | | |
|---|---|---|---|
| 3,480,341 | 11/1969 | Hickernell | 384/95 |
| 3,720,274 | 3/1973 | McCallum | 175/372 |
| 3,746,405 | 7/1973 | Welton | 384/93 |
| 4,098,358 | 7/1978 | Klima | 175/65 |
| 4,190,301 | 2/1980 | Lachonius et al. | 384/95 |
| 4,194,794 | 3/1980 | Kling | 384/93 |
| 4,270,812 | 6/1981 | Thomas | 384/95 |
| 4,416,554 | 11/1983 | Pribbenow | 384/95 |
| 4,421,184 | 12/1983 | Mullins | 175/337 |
| 4,428,442 | 1/1984 | Steinke | 175/228 |
| 4,451,162 | 5/1984 | Shepherd | 384/95 |
| 4,549,820 | 10/1985 | Mullins | 384/95 |
| 5,148,879 | 9/1992 | Hooper | 175/371 |

*Primary Examiner*—Thomas R. Hannon
*Attorney, Agent, or Firm*—Conley, Rose & Tayon, P.C.

[57] ABSTRACT

A first embodiment of a radially disposed thrust bearing assembly for rotary cone rock bits consists of a first non-rotating radially disposed steel thrust bearing disc and an adjacent, carbide thrust bearing disc. One of the thrust bearing discs is pressed into a disc retention socket formed in the end of a spindle bearing extending from the end of a main axially aligned bearing cantilevered from a leg of the bit and the other thrust bearing disc is pressed into a disc retention socket formed in the rotary cone. An edge of the carbide disc is formed with large valleys and peaks, the robust undulations resist cracking when the carbide thrust bearing disc is pressed into its respective socket. Unique air passages and channels are formed in the main and spindle bearings to direct cooling air to the thrust bearing discs. A second embodiment of a radially disposed thrust bearing assembly for rotary cone rock bits consists of a pair of preferably carbide thrust buttons, each of which has a central bore and a plurality of channels on its back face. The channels and central bore communicate with an air passage through the bit so as to provide a flow of cooling fluid such as air to the back of each thrust button. The invention further includes thrust bearing systems in which both of the thrust buttons comprise hard metal or sintered material.

35 Claims, 13 Drawing Sheets

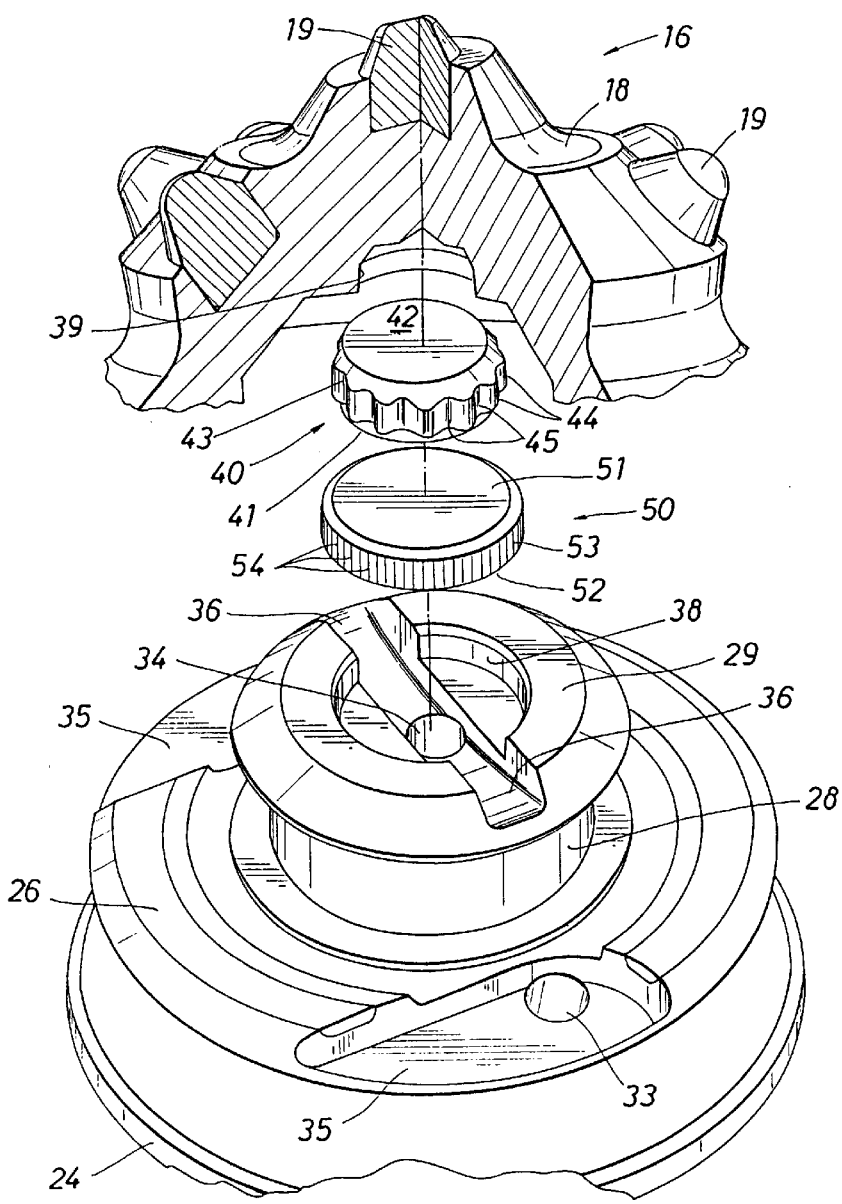
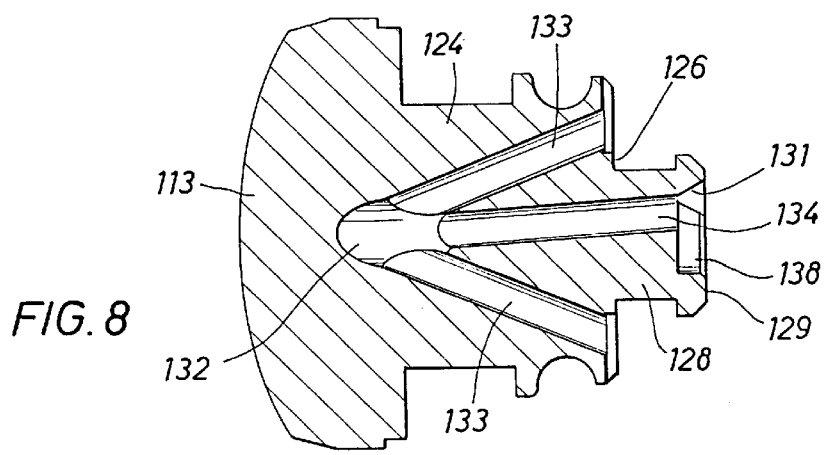

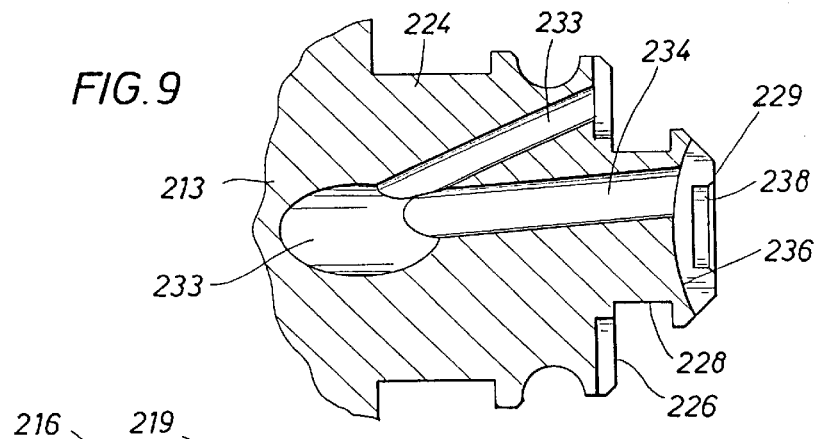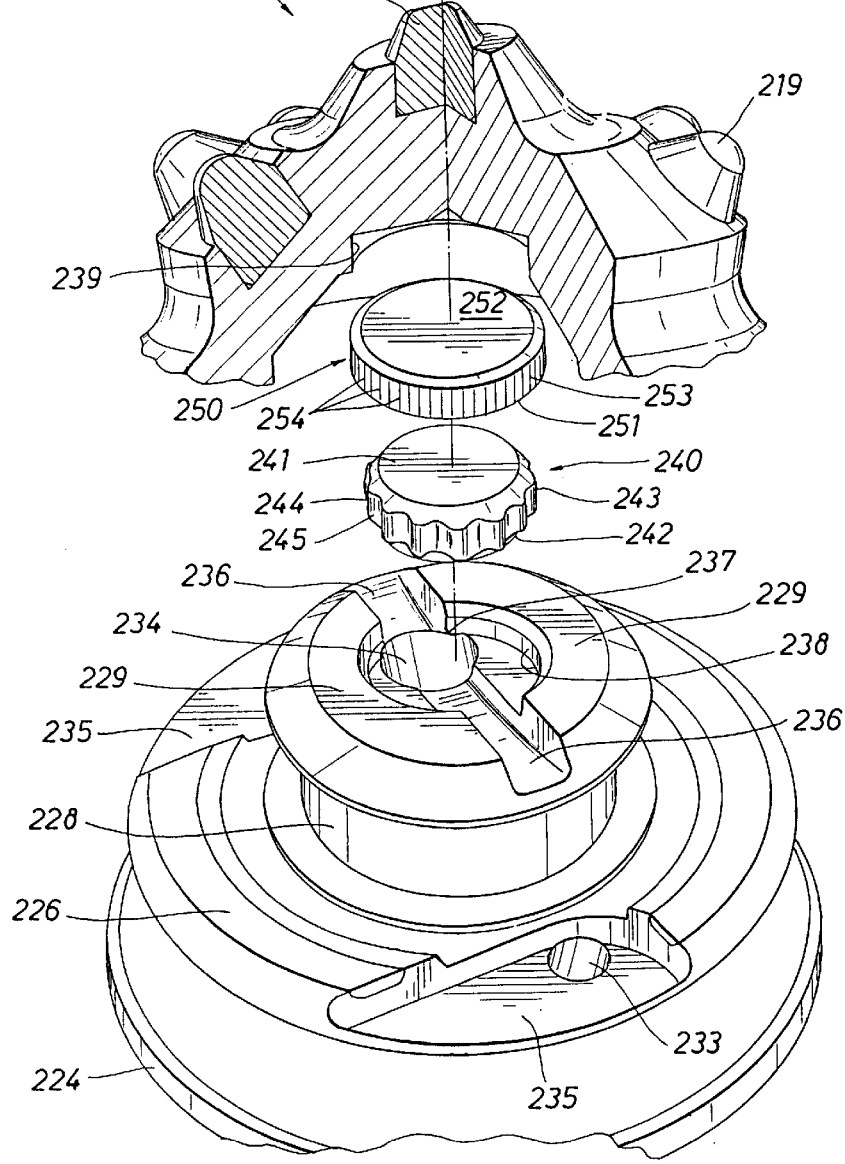

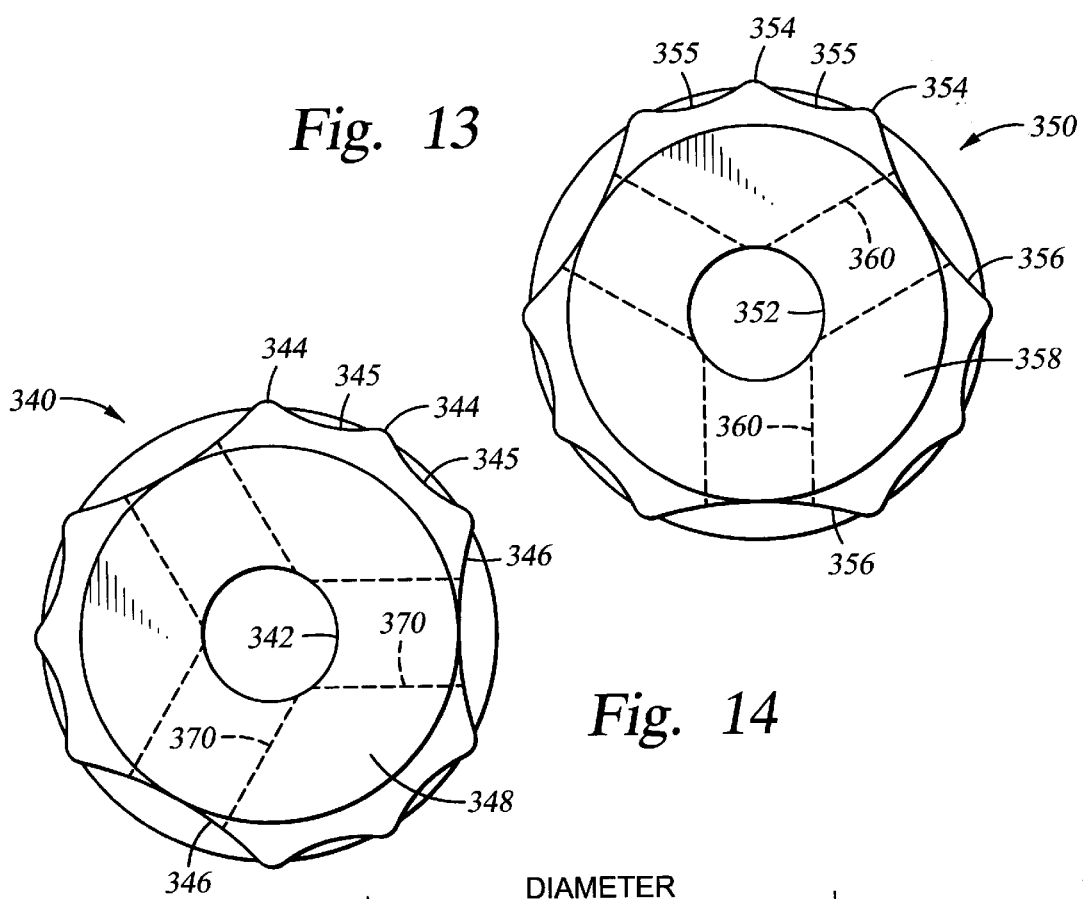
Fig. 13
Fig. 14
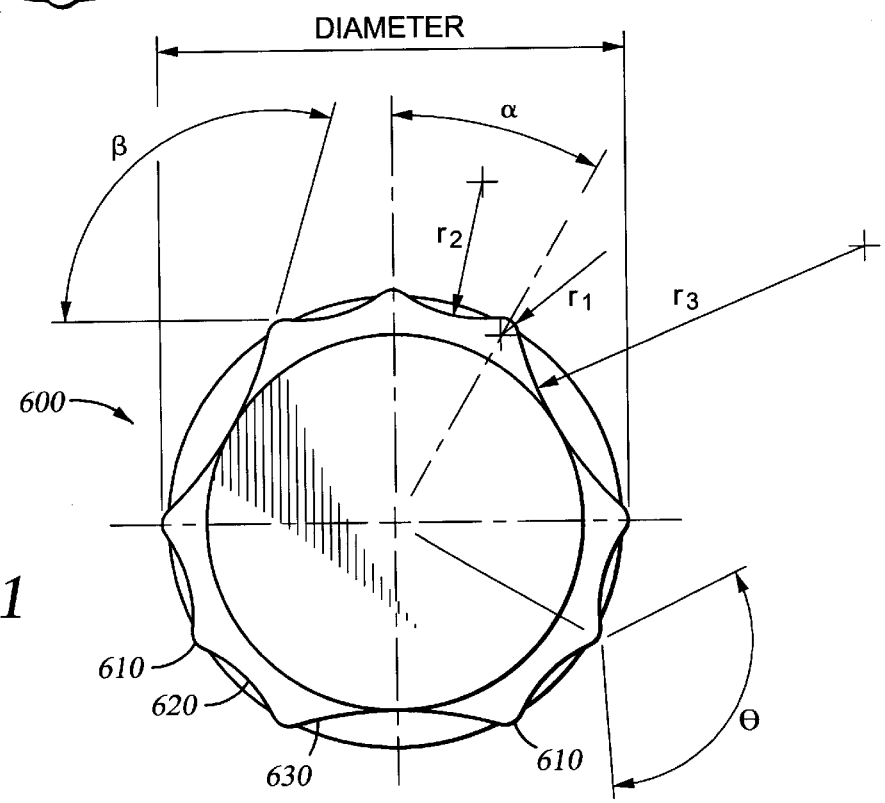
Fig. 21

THRUST DISC BEARINGS FOR ROTARY CONE AIR BITS

This application is a continuation-in-part of Ser. No. 08/622,646 filed Mar. 26, 1996 now U.S. Pat. No. 5,642,942.

BACKGROUND OF THE INVENTION

1. Field of the Invention

This invention relates to thrust bearings for rotary cone rock bits that utilize fluid such as air to cool and clean the bit as it works in a borehole.

More specifically, this invention relates to a thrust bearing radially disposed between a roller cone and a journal and a means to secure and cool the thrust bearing therebetween. Still more particularly, the present invention comprises a thrust bearing made of very hard, temper resistant material, in which the non-wearing bearing is supported in the cone and channels are provided along the back of each thrust bearing for the purpose of allowing cooling air to contact each bearing.

2. Background

Rotary drill bits are generally well known in the art. These bits typically include three cone-shaped members adapted to connect to the lower end of a drill string. The bit includes three individual arms that extend downward from the bit body at an angle with respect to the bit axis. The lower end of each arm is shaped to form a spindle or bearing pin. A cone cutter is mounted on each spindle and adapted to rotate thereon. As the drill string rotates, the cones roll on the borehole bottom and rotate on about their respective spindles, thereby disintegrating the formation to advance the borehole. Individual bearing systems allow rotation of the cone cutter and serve to maintain the cone cutter on the spindle. These bearing systems have traditionally comprised roller bearings, ball bearings or friction bearings, or some combination of these.

In addition to providing bearings to facilitate rotation of the cone cutter, the interface between each spindle and its cone cutter typically includes a device for transmitting thrust (axial) forces from the cone cutter to the spindle and thence to the bit. These "thrust bearings" for rotary drill bits can generally be grouped into two different types. In one type the bearing system is sealed and the bearings are supplied with a lubricant. This bearing construction is most practical in oil drilling, where the axial feed forces are moderate. The frictional work and the development of heat in the bearings are small and the temperature in the bearings can be held at a low level. Thus, it is not necessary to supply air or other cooling fluid to the bearing. The other type of bearing is not sealed, and includes an internal channel or passage through which cooling air is supplied to the bearing. This type of bearing is commonly used in mining operations, where the load on the bearings is substantial. Because of the large load, the frictional forces on the bearing generate extreme heat and wear and it is necessary to provide a flow of air across the bearing to cool it, or an advanced material that has low friction characteristics and high temper resistance. The prior art includes several patents that disclose various wear-resistant means for transmitting the thrust load from each cone cutter to its respective spindle via a journal bearing surface and means for cooling the frictional interface.

For example, it is within the state of the art to provide a bearing surface, which comprises a hardmetal surface deposited on radially disposed areas of the journal. The deposited hardmetal material is subsequently machined to provide a smooth bearing surface between the journal and the rotary cone thrust button. This technique has the disadvantage that, when hardmetal material is metallurgically deposited within the cone or on the radially disposed bearing surfaces of the journal, the heat generated causes stress risers in the substrate that can result in cracks, especially in rotating cones. In addition, it is difficult, costly and time-consuming to machine the surface of these rough, hardmetal deposits to form the smooth bearing surfaces essential to the proper operation and longevity of the rock bit. These materials have poor thermal shock capabilities and limited resistance to the softening effects of high temperature.

Another type of thrust bearing comprises a pair of "thrust buttons" that are manufactured separately from the cone and spindle and then inserted into opposing recesses in the cone and spindle respectively. U.S. Pat. No. 4,194,794 to Kling discloses such a system, in which thrust buttons 22 and 25 are provided to transmit thrust loads from the cone cutter to the bit. Concentrating the load in a small area in this manner results in the generation of large amounts of heat as the frictionally engaged faces of thrust buttons 22 and 25 are forced to rotate with respect to each other. In addition, even small amounts of axial misalignment lead to severe stress concentrations at the edges of the buttons with this combination of materials because the hard, non-wearing members in the leg do not accommodate the misalignment. Kling further discloses an air cooling system that includes the placement of air ducts in each leg. The ducts are positioned so that they provide a flow of air at a point on the periphery of the spindle thrust button. The presence of dual roller bearings tends to reduce the cross-sectional spindle area available for air flow and thrust bearings.

Another variation on the double thrust button concept is disclosed in U.S. Pat. No. 4,098,358 to Klima. Klima discloses a spindle thrust button having a central opening and channels on its wear face that communicate with an air duct in the leg. The cone thrust button also has channels on its wear face. These channels communicate with the central opening and channels on the face of the spindle thrust button as the two buttons rotate relative to each other. While the placement of the cooling air channels on the wear faces of the thrust button would appear to allow more efficient removal of heat from the wear faces, this configuration actually produces a marked adverse effect. Namely, as a given portion of one wear face rotates over the other wear face, it is heated by friction with the other face. When the same portion then rotates over one of the cooling channels in the other wear face, it is subject to an abrupt reduction in temperature, which is then followed by another heat-generating contact, etc. This type of temperature fluctuation results in thermal fatigue that is very detrimental to high strength tool steels and hardmetal weld deposits. The surfaces of tool steel buttons, for example, develop fine heat checking cracks, which in turn eventually propagate until the button ultimately fails.

Still another disadvantage associated with the thrust buttons of the prior art arises out of the nature of the interference fit between each thrust button and the socket in which it is received. Specifically, while it is desirable to provide wide, robust teeth or knurls for engaging the hoop, it is also desirable to provide some clearance into which material deformed from the hoop can flow. As the amount of clearance area increases, the portion of the periphery of the thrust disc that is available for the teeth decreases. As the teeth are forced closer together, each tooth tends to get sharper. In addition, if it is desired to provide any flow of cooling fluid to the periphery of a thrust disc, the addition of passageways for the cooling fluid tends to further compromise the space available for the teeth and therefore tends to result in sharper, and therefore weaker, teeth.

Another common problem with the systems of the prior art lies in the relative positions of the wearing and non-wearing thrust bearing components. Specifically, if the non-wearing thrust bearing is placed on the spindle, the wearing member cannot compensate for misalignment of the friction bearing surfaces. Misalignment will occur after wear accumulates on the radial bearing and thrust bearing systems, with the result that the surfaces will no longer be parallel and a stress concentration will develop on the load side of the bearing.

Hence, it is desired to provide a thrust bearing system that adequately cools the thrust bearings without causing thermal fatigue, and compensates for slight misalignments of the cone cutter. It is further desired to provide a thrust bearing system for use in a rolling cone cutter that is relatively simple and inexpensive to manufacture and assemble, and that is durable under normal operating conditions. It is further desired to provide a thrust button configuration that allows for peripheral cooling of the thrust button and allows clearance into which deformed hoop material can flow, while still providing a plurality of wide, robust teeth, or knurls around the periphery of the disc.

SUMMARY OF THE INVENTION

It is therefore an object of this invention to provide a system that includes as large a thrust bearing interface as possible and means for efficiently and effectively cooling that interface without adverse thermal effects. It is further an object of the present invention to provide a hard metal thrust button mounted in the spindle and a harder metal thrust button mounted in the cone for engaging the spindle thrust button. One embodiment of the present invention includes a plurality of cooling air channels in the back of both the spindle thrust button and the cone thrust button. The channels are formed in the thrust buttons themselves, rather than in the components housing the thrust buttons. The channels communicate with a central air duct and with an inner bearing cavity and thus provide a steady flow of cooling air through and across each thrust bearing. Cooling fluid flows either through communicating central bores in the two thrust buttons, or through passages formed in the periphery of each thrust button. Other embodiments of the present invention include thrust buttons that include only peripheral fluid passages, or a combination of peripheral fluid passages with channels and or central openings. In addition, it is an object of this invention to provide a hard metal carbide thrust button with large peaks and valleys around its knurled perimeter. The peaks or knurls provide an interference fit in the receiving socket and valleys serve to reducing stress caused by the interference fit. The peaks and valleys around the edge of the relatively brittle carbide thrust button prevent the carbide from cracking when it is interference fitted or pressed into a socket in either the end of the spindle or the rotary cone and provide a relieved area into which material from the hoop can flow as a result of the interference fit. An advantage, then, of the present invention over the prior art is the use of a hard metal thrust bearing with engagement peaks and radiused valleys around the knurled perimeter of the thrust bearing. It is a further object of the present invention to provide a thrust button configuration that provides both peripheral fluid ducts and sufficient clearance adjacent each knurl to allow for deformation of the hoop material and also includes wide, robust knurls that are less likely to break as a result of the interference fit.

It is a still further object of the present invention to provide a thrust bearing system for a rotary cone rock bit that includes thrust bearing surfaces having high thermal conductivity, low friction, high wear resistance, and high resistance to tempering. The preferred materials disclosed exhibit reduced wear rates and operate effectively in either lubricated or unlubricated and cooled or uncooled systems.

BRIEF DESCRIPTION OF THE DRAWINGS

FIG. 7 is a partially broken away exploded perspective view of a journal bearing and rotary cone with a pair of thrust bearings disposed therebetween;

FIG. 8 is a cross-section of a journal bearing cantilevered from a leg of the rock bit illustrating the air passages formed therein;

FIG. 9 is a cross-section of a journal bearing with alternative, different diameter air passage grooves formed therein;

FIG. 10 is a partially broken away, exploded perspective view of a journal bearing and rotary cone illustrating an alternative embodiment of the invention;

FIGS. 13 and 14 are enlarged front elevations of the spindle and cone thrust bearings shown in FIG. 11, respectively;

FIG. 21 is a plan view of a preferred embodiment of a thrust button constructed in accordance with the present invention.

DESCRIPTION OF THE PREFERRED EMBODIMENTS

Figure 1:
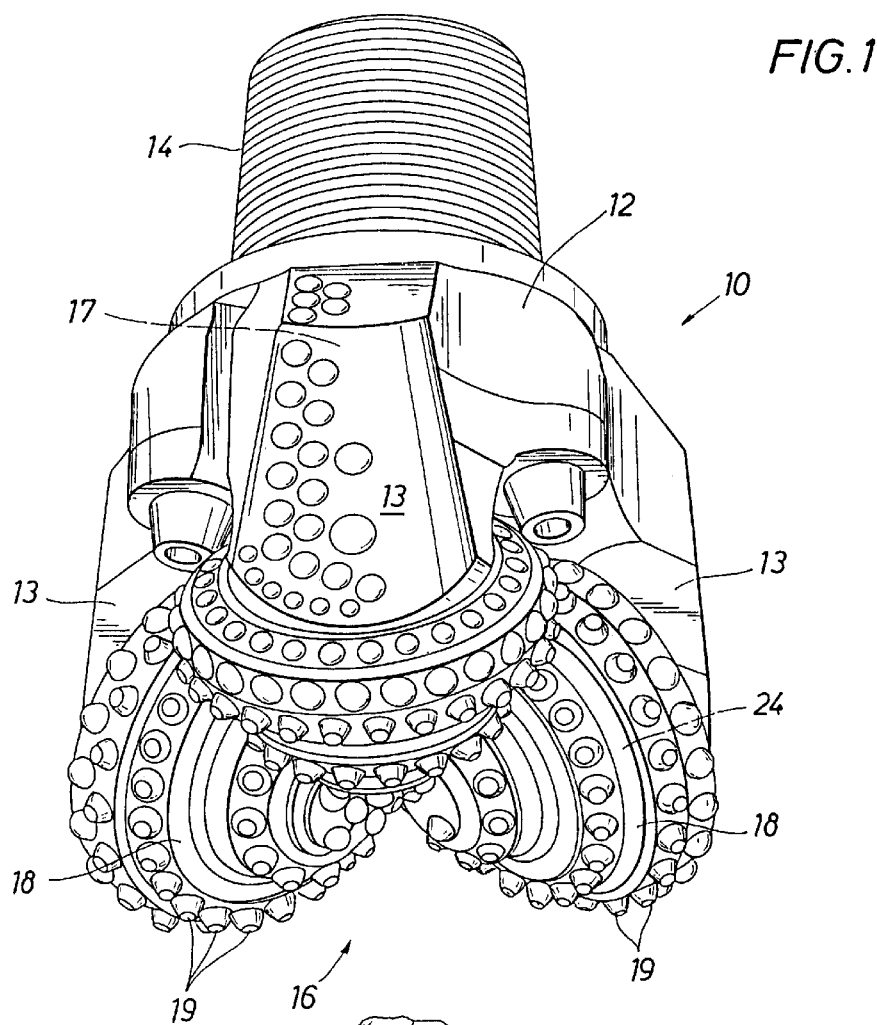
FIG. 1 is a perspective view of a typical rotary cone mining rock bit that is cooled and lubricated by air.
Figure 2:
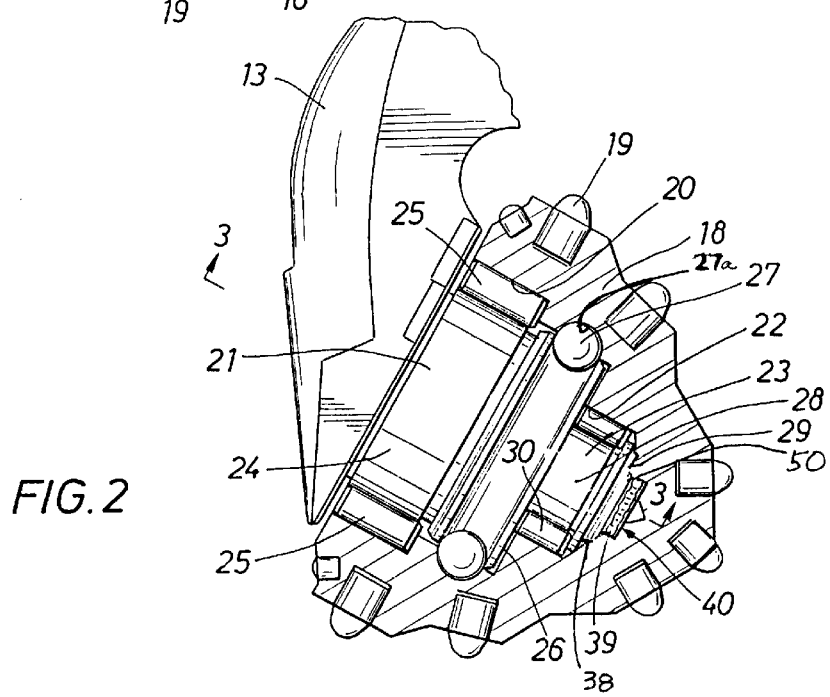
FIG. 2 is a partial cross-section of a rock bit leg, bearing and rotary cone constructed in accordance with one embodiment of the present invention.

Referring initially to FIGS. 1 and 2, a typical mining, roller bearing, air cooled rotary cone rock bit generally designated as 10 consists of bit body 12, including a threaded pin end 14 and a cutting end generally designated as 16. Cutting end 16 comprises three substantially parallel legs 13, which are integrally formed with bit body 12. Each leg 13 supports a rotary cone 18 that is rotatably retained on a cantilevered spindle 24. Each cone 18 supports a plurality of tungsten carbide inserts 19 extending from its surface. With particular reference now to FIG. 2, spindle 24 extending from the leg 13 forms bearing races 21 and 23 for roller bearings 25 and 30. Intermediate roller bearings 25 and 30, a plurality of ball bearings 27 rotatably retain the cone 18 on the spindle 24. Spindle 24 forms a radially disposed main bearing face 26 from which a spindle bearing 28 extends. A spindle thrust bearing disc, or "thrust button," generally designated as 50, is pressed into a bearing cone cavity or socket 38 formed in cone spindle bearing 28. Cone 18 includes an internal cavity adapted to receive spindle 24 and the bearings 25, 27 and 30. The cone cavity includes cylindrical surfaces 20 and 22, ball bearing race 27a, and socket 39. The radial end face 29 of spindle bearing 28 extends into the cone cavity adjacent cylindrical surface 22. A cone thrust bearing disc, or "thrust button," generally designated as 40, is pressed into a bearing cone cavity or socket 39 formed in cone 18. As discussed in greater detail below, cone thrust disc 40 engages spindle thrust disc 50, with the interface therebetween forming a thrust bearing.

Figure 3:
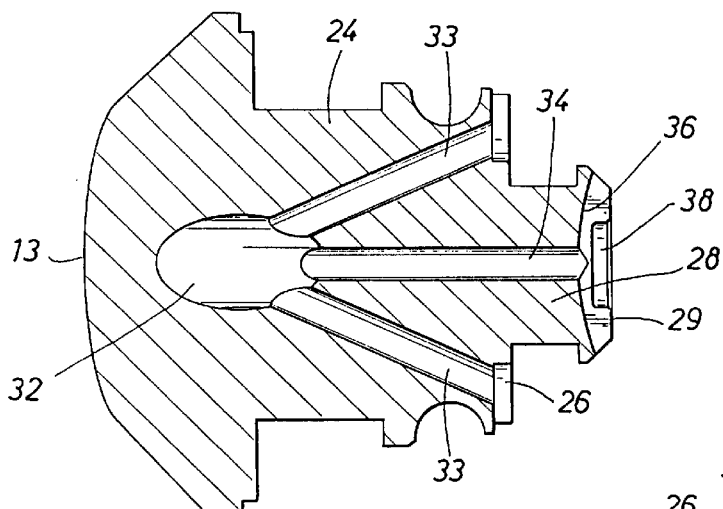
FIG. 3 is a view taken through 3—3 of FIG. 2 illustrating the air fluid passages formed in the leg and journal bearing.
Figure 4:
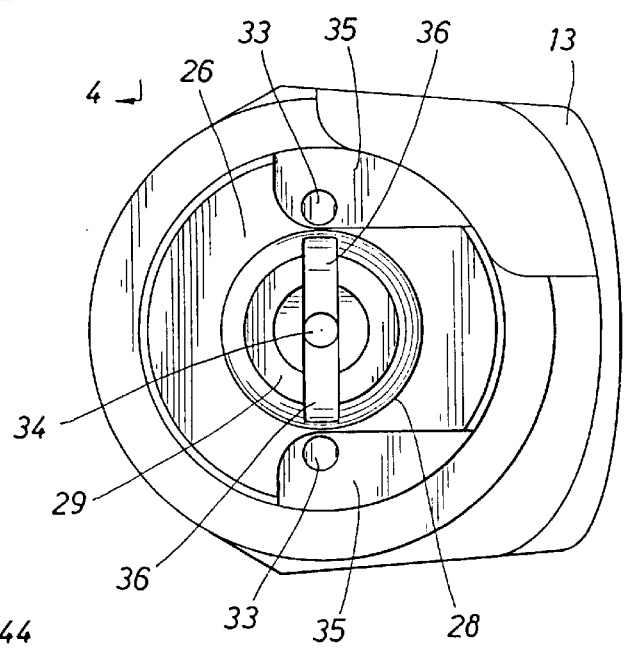
FIG. 4 is an end view taken through 4—4 of FIG. 3.

Referring now to FIGS. 3 and 4, spindle 24 includes a main air fluid passage 32 formed in leg 13. Air passage 32 communicates with a plenum (not shown) formed in bit body 12, which in turn is open to pin end 14. Secondary air passages 33 direct air from main passage 32 to the main bearing face 26. An axially aligned air passage 34 directs air to a cross channel 36 that is formed in the radial end face 29 of the spindle 28. Cross channel 36 intersects and passes beneath, in this embodiment, a hardened steel bearing thrust button generally designated as 50 that is interference fitted or pressed into socket 38 formed in spindle 28 (see FIG. 7). The cross channel 36 is more clearly seen with reference to FIG. 4. Air passes from central passage 34 into channel 36, thereby contacting base 52 of spindle thrust button 50. Air contacting base 52 of thrust button 50 serves to cool thrust button 50 and adjacent cone thrust button 40.

Figure 6:
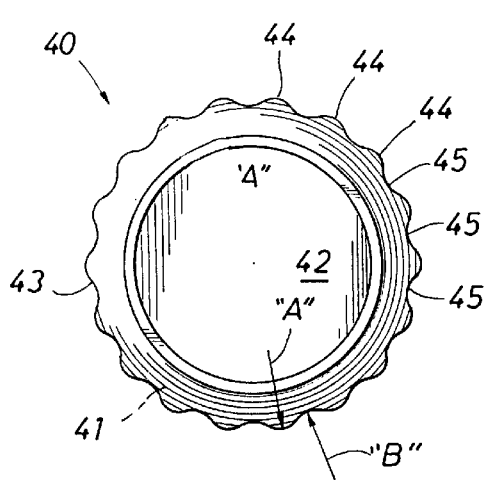
FIG. 6 is a view taken through 6—6 of FIG. 5.
Figure 5:
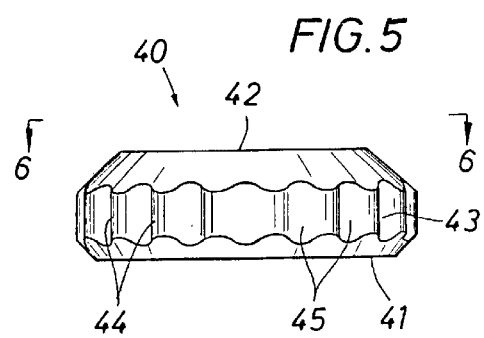
FIG. 5 is a side view of a carbide thrust bearing illustrating relatively large hill and valley undulations formed around the peripheral edge of the thrust button.
Figure 11:
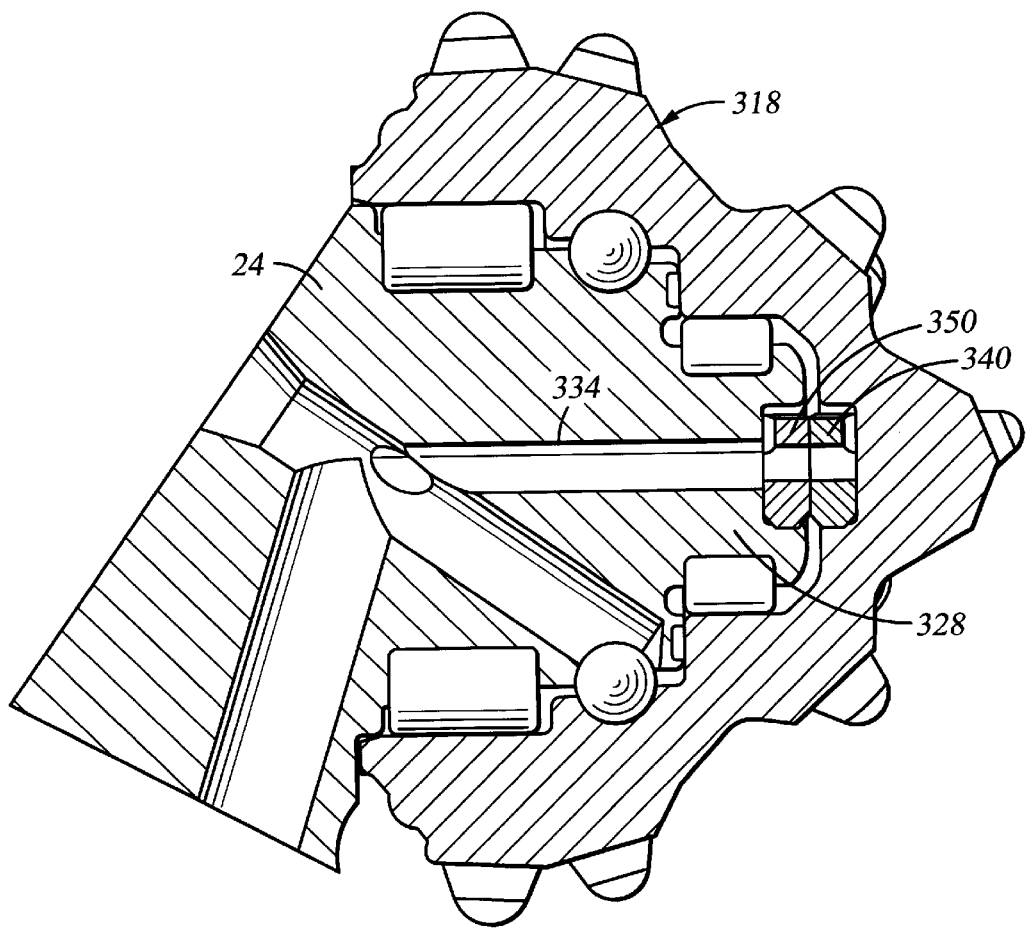
FIG. 11 is a cross-section of a rock bit leg, bearing and rotary cone showing an alternative, preferred embodiment of a thrust bearing system.

Referring now to FIGS. 5 and 6, in one preferred embodiment, cone thrust button 40 preferably comprises tungsten carbide, grade 510, such as is manufactured by Rogers Tool Works, Rogers, Ark. The outer peripheral edge of the carbide disc 40 consists of a series of relatively large undulations comprising a plurality of axially aligned peaks 44 and valleys 45, the peaks preferably being 20 degrees apart. By way of example only, a tungsten carbide thrust plug designed for a 7⅞ inch rotary cone air bit is preferably between 0.698 and 0.702 inches in diameter and between 0.228 and 0.232 inches thick. The radii "A" and "B" are the radii of curvature of the peaks 44 and valleys 45 respectively and, in one preferred embodiment, are both approximately 0.047 inches.

Without stress-reducing knurling, thrust bearing discs made of brittle material such as carbide would easily crack when pressed or interference fit into a socket thrust plug receptacle and would crack under the impact loading of normal drilling operations. The large peaks and valleys of thrust button 40 allow for secure retention of the disc in its retention socket 39 without danger of cracking. Moreover, the large spacing between peaks 44 allows cooling air to penetrate the edge of the disc to help cool the thrust plug 40 while the bit 10 works in a borehole.

The exploded perspective view of FIG. 7 further illustrates thrust button 50, having normal retention grooves 54 cut into its peripheral edge 53. As mentioned above, base 52 of bearing 50 lies adjacent channel 36 when thrust button 50 is pressed into socket 38. Thus, air directed into channel 36 through passage 34 cools disc 50, which in turn serves to cool thrust button 40.

FIG. 8 is an alternative design, which is primarily suited for bits smaller in diameter than 7⅞ inches. The bit leg 113 forms passage 132 which in turn feed air to journal passages 133 to main bearing face 126 and passage 134 to the end of spindle 128. The difference between this embodiment and the preferred embodiments of FIGS. 1 through 7 is that there is no channel across the end 129 of spindle 128. Instead, the exit 131 of passage 134 is offset from the spindle axis and flared to direct cooling air around and through the bearing surfaces formed between opposite thrust plugs at the end of the spindle (not shown).

FIG. 9 is still another embodiment of the invention wherein the bit leg 213 forms air channel 233, which feeds air to a single air passage 233. Air passage 233 leads to the main bearing face 226. An enlarged, substantially central, air passage 234 directs air into channel 236 formed in end 229 formed in spindle 228.

FIG. 10 differs from FIG. 7 in that the tungsten carbide disc or thrust button 40 is pressed into socket 238 formed in end 229 of spindle 228. Thrust bearing disc 50 is pressed into socket 239 formed in cone 216. The exit 237 of passage 234 is offset from the axis of the spindle and intersects the channel 236 at a point nearest the undulating edge 243 of disc 40. Hence, air flow is directed more efficiently both under surface 242 of the disc 40 and across the mated thrust bearing surfaces 241 and 251 of the both discs.

Air is directed through single air passage 233 onto main bearing face 226 and into a relieved channel 235 formed therein. The relieved shelf 235 on opposite sides of the main bearing face assures that sufficient coolant is supplied to the radial bearing surfaces formed between the journal 224 and the rotating cone 216 secured thereto.

Referring now to FIGS. 11–15, the improved thrust bearing system of the present invention comprises a spindle thrust bearing 350 that is received in a corresponding socket 338 in a spindle 328 and a cone thrust bearing 340 that is received in a corresponding socket 339 in a cone 318. Spindle socket 338 is defined by a socket bottom 321 and a hoop 322. Referring particularly to FIG. 13, spindle thrust bearing 350 preferably comprises a carbide disc having a central bore 352 therethrough and knurled periphery defined by a plurality of knurls 354 and valleys 355. In addition, the periphery of spindle thrust bearing 350 includes at least one recessed portion 356, which has a significantly larger radius of curvature than the radius of curvature of either knurls 354 or valleys 355 and is more relieved from the hoop 322 than are valleys 355. One face 358 of bearing 350 is substantially flat (FIG. 11) and engages cone thrust bearing 340. Face 358 is thus designated the wear face. The opposite, or back, face 359 engages socket bottom 321 when bearing 350 is received in socket 338 and includes at least one radial channel 360 that communicates with central bore 352 and with recess 356. In the preferred embodiment shown, there are three recesses 356 and three corresponding channels 360. In order to resist the torque that is generated on wear face 358, knurls 354 are designed to interfere with the socket hoop 322. To further secure the bearing 350 and to transmit axial forces to the spindle, back face 359 engages socket bottom 321. These mated surfaces produce a friction force that counteracts the torque generated on the sliding bearing surface and serve to transmit the axial bearing load. As shown, it is preferred that valleys 355 be slightly concave, so as to accommodate material displaced from socket hoop 322 when bearing 350 is interference fit into socket 338.

Figure 12:
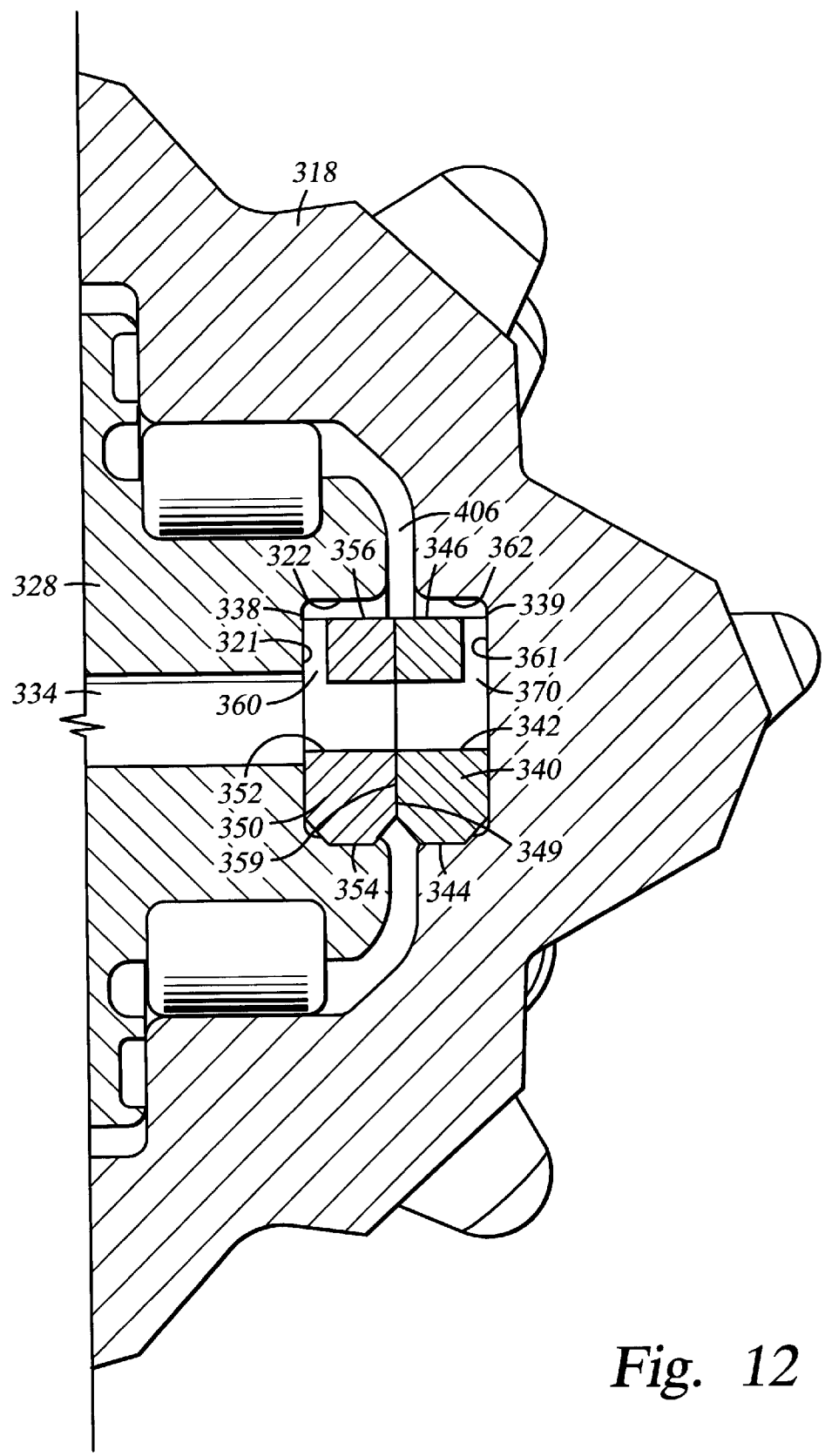
FIG. 12 is an enlarged cross-section of the thrust bearing system of FIG. 11.
Figure 15:
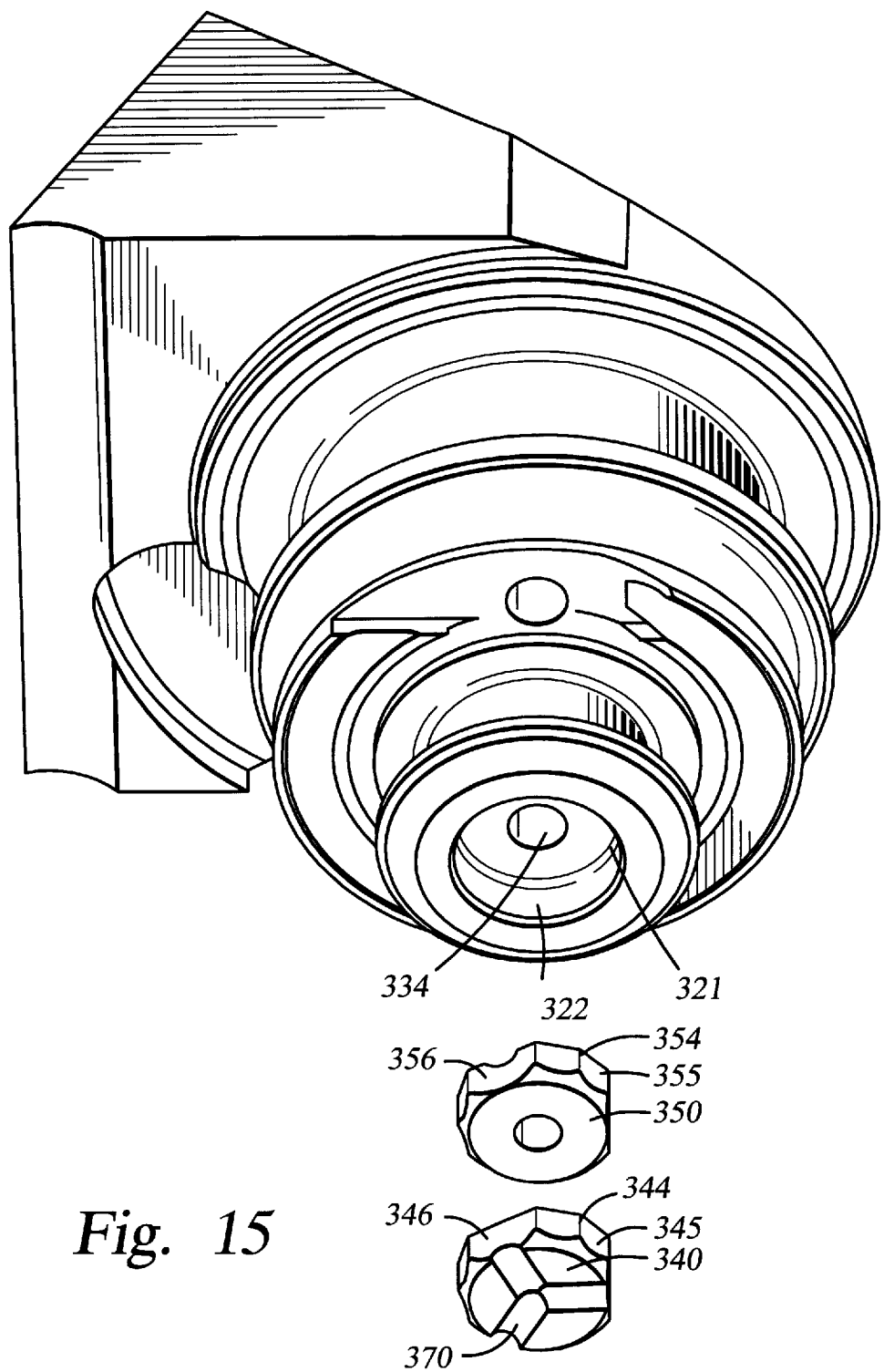
FIG. 15 is an exploded perspective view of the thrust bearing system of FIG. 11.
Figure 16:
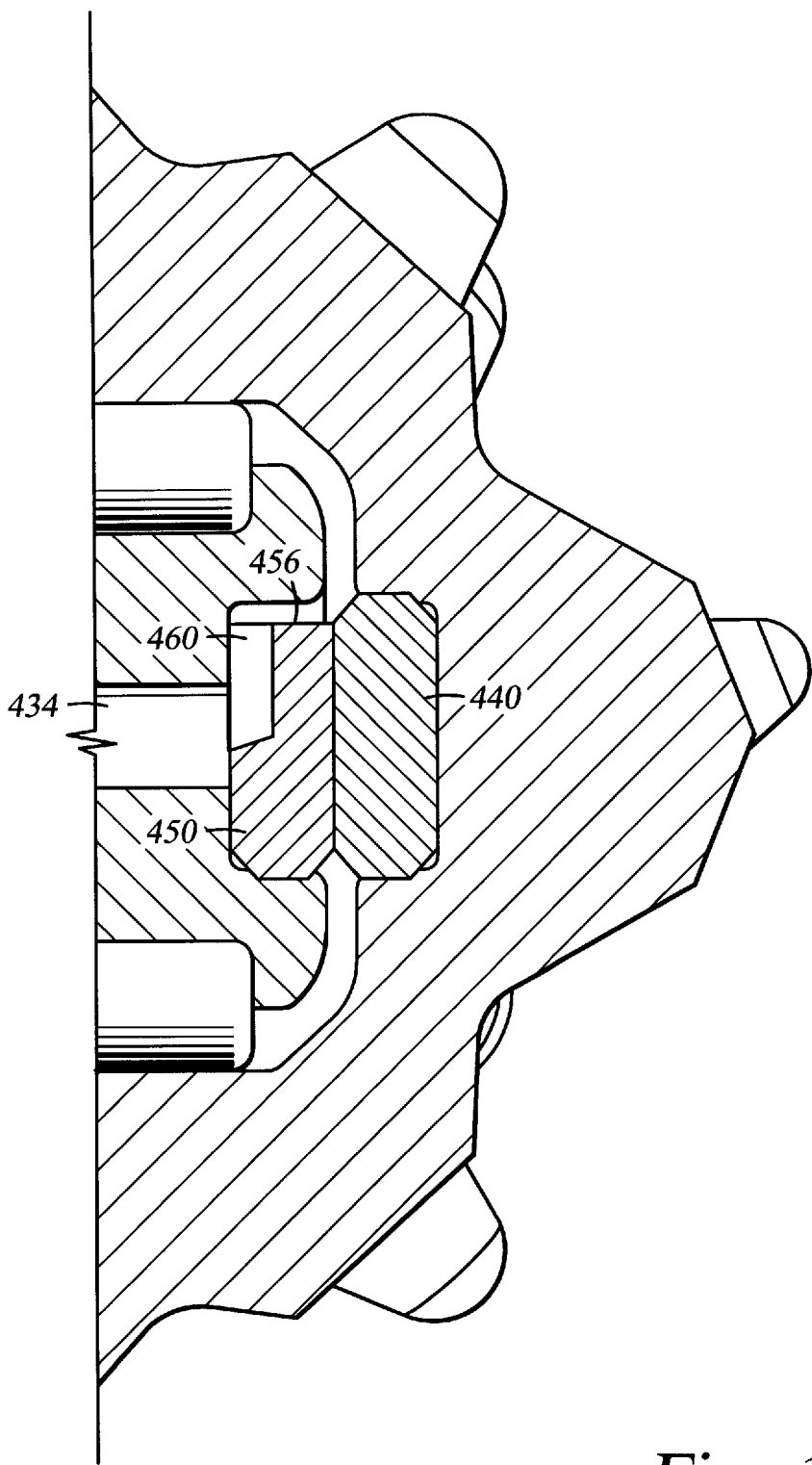
FIG. 16 is an enlarged cross-section of an alternative embodiment of the system shown in FIG. 12.
Figure 17:
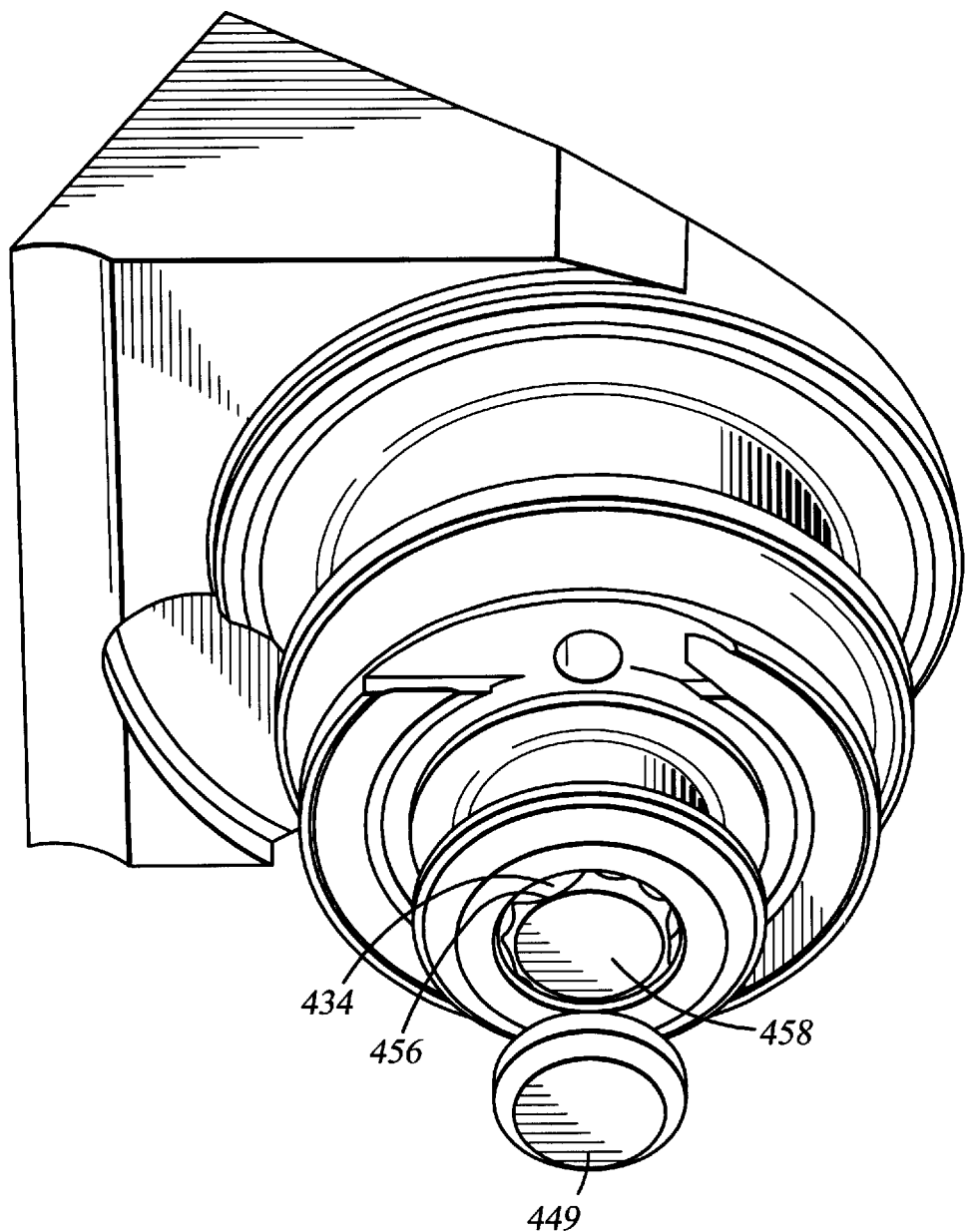
FIG. 17 is an exploded perspective view of the thrust bearing system of FIG. 16.

As shown in FIG. 12, cone socket 339 is defined by a socket bottom 361 and a hoop 362. Referring particularly to FIG. 14, cone thrust bearing 340 preferably comprises a carbide disc having a central bore 342 therethrough and knurled periphery defined by a plurality of knurls 344 and valleys 345. In addition, the periphery of cone thrust bearing 340 includes at least one recessed portion 346, which has a significantly larger radius of curvature than the radius of curvature of either knurls 344 or valleys 345 and is more relieved from the hoop 362 than are valleys 345. One face 348 of bearing 340 is substantially flat and engages wear face 358 of bearing 350. The opposite, or back, face 349 engages socket bottom 361 when bearing 340 is received in socket 339 and includes at least one radial channel 370 that communicates with central bore 342 and with recess 346. In the preferred embodiment shown, there are three recesses 346 and three corresponding channels 370. In order to resist the torque that is generated on the wear face 348, knurls 344 are designed to interfere with the socket hoop 362. To further secure the bearing 340 and to transmit axial forces from the cone, back face 349 engages socket bottom 361. These mated surfaces produce a friction force that counteracts the torque generated on the sliding bearing surface and serve to transmit the axial bearing load. As shown, it is preferred that valleys 345 be slightly concave, so as to accommodate material displaced from socket hoop 362 when bearing 340 is interference fit into socket 339.

Referring again to FIGS. 11 and 12, an axial air passage 334 through spindle 328 delivers air to the bottom of socket 338. This air then flows axially through spindle thrust disc 350 via bore 352 and simultaneously flows radially toward the periphery of spindle thrust disc 350 via channels 360. Air flow continues axially through cone thrust bearing 340 via bore 342 and simultaneously radially toward the periphery of bearing 340 via channels 370. Recesses 346, 356 allow channels 360, 370 respectively to communicate with a cavity 406 formed between cone 318 and spindle bearing 328. From cavity 406, air exits in a conventional manner through a series of passages formed between the inner surface of cone 318 and spindle 24.

Alternative embodiments of the present thrust bearing system are shown in FIGS. 16–17 and 18–19. In the system shown in FIGS. 16–17, only spindle thrust button 450 is provided with channels 460 and peripheral recessed portion 456. Air flows into channels 460 from an axial air duct 434 and exhausts from the periphery of the thrust buttons in a conventional manner. Cone thrust button 440 is cooled only by thermal contact with spindle thrust button 450 and by its minor thermal contact with fluid in the recess formed by the recessed periphery of spindle thrust button 450.

Figure 18:
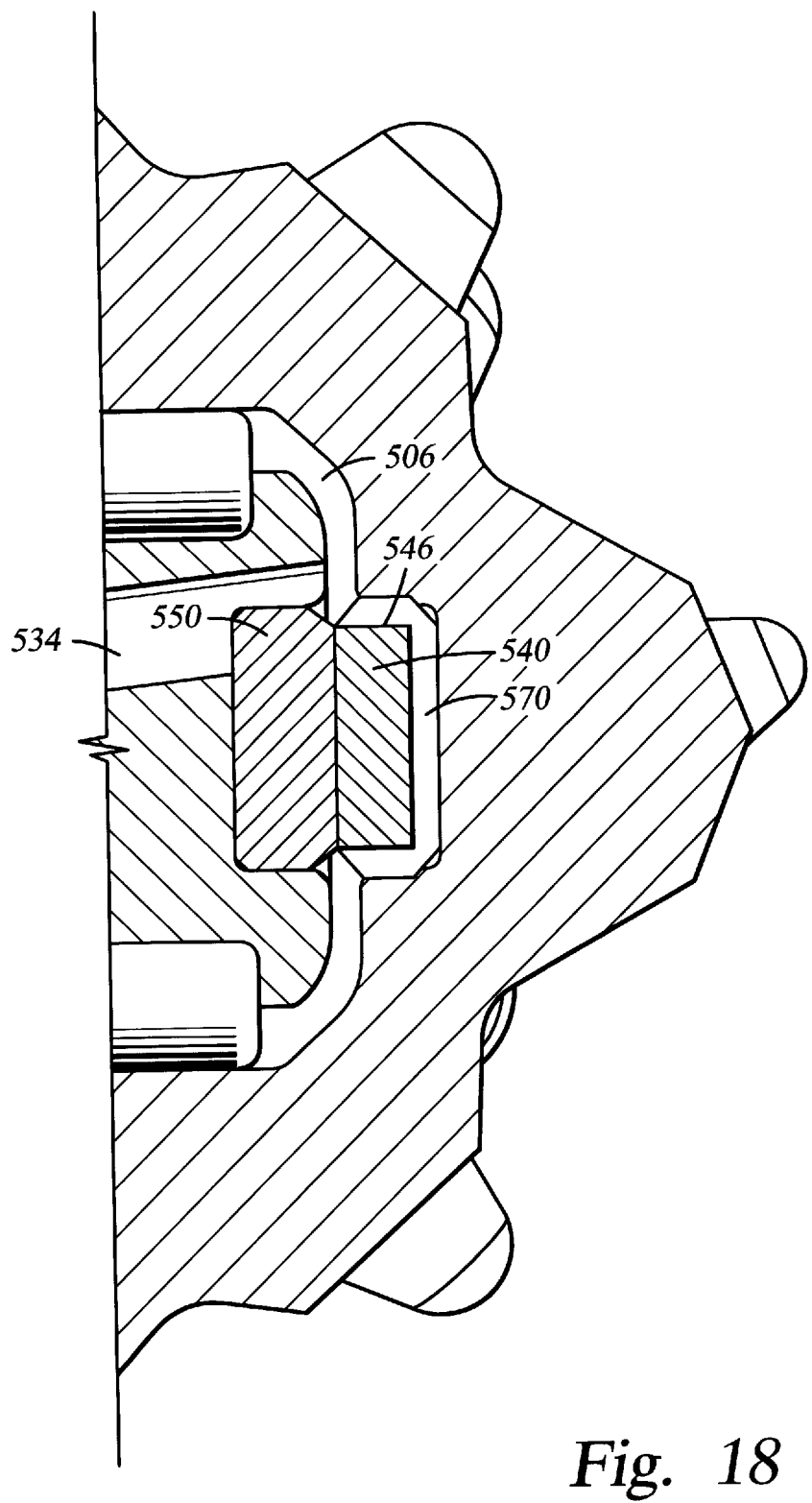
FIG. 18 is an enlarged cross-section of a second alternative embodiment of the system shown in FIG. 12.
Figure 19:
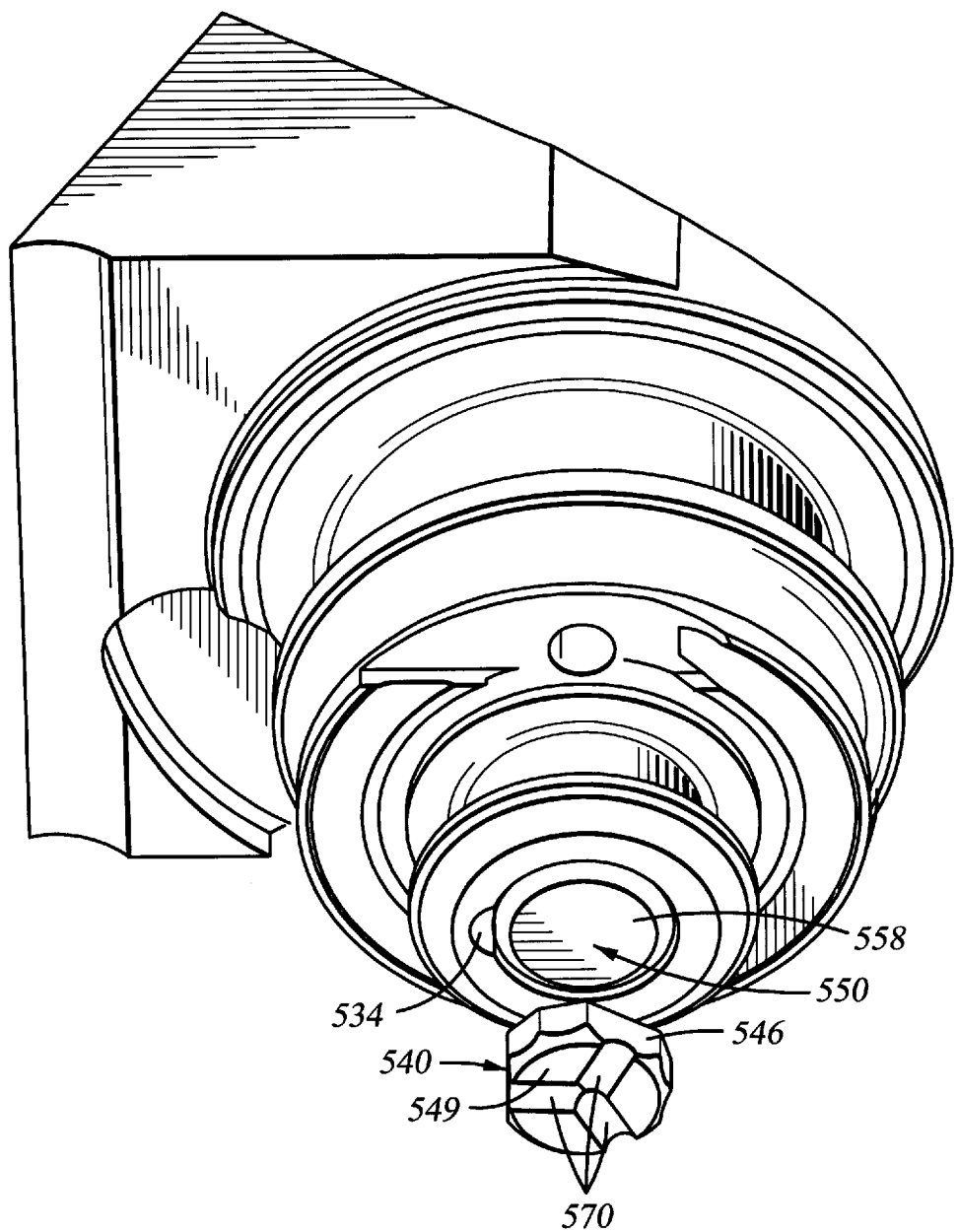
FIG. 19 is an exploded perspective view of the thrust bearing system of FIG. 18.

In the embodiment shown in FIGS. 18–19, only cone thrust button 540 is provided with channels 570 and peripheral recessed portion 546. Air flows into recessed portion 546 from an off-center fluid duct 534, and from there through channel 570 and out through a conventional exhaust passage. Spindle thrust button 550 is cooled only by thermal contact with cone thrust button 540 and by its minor thermal contact with fluid in the recess formed by the recessed periphery of spindle thrust button 540.

Figure 20:
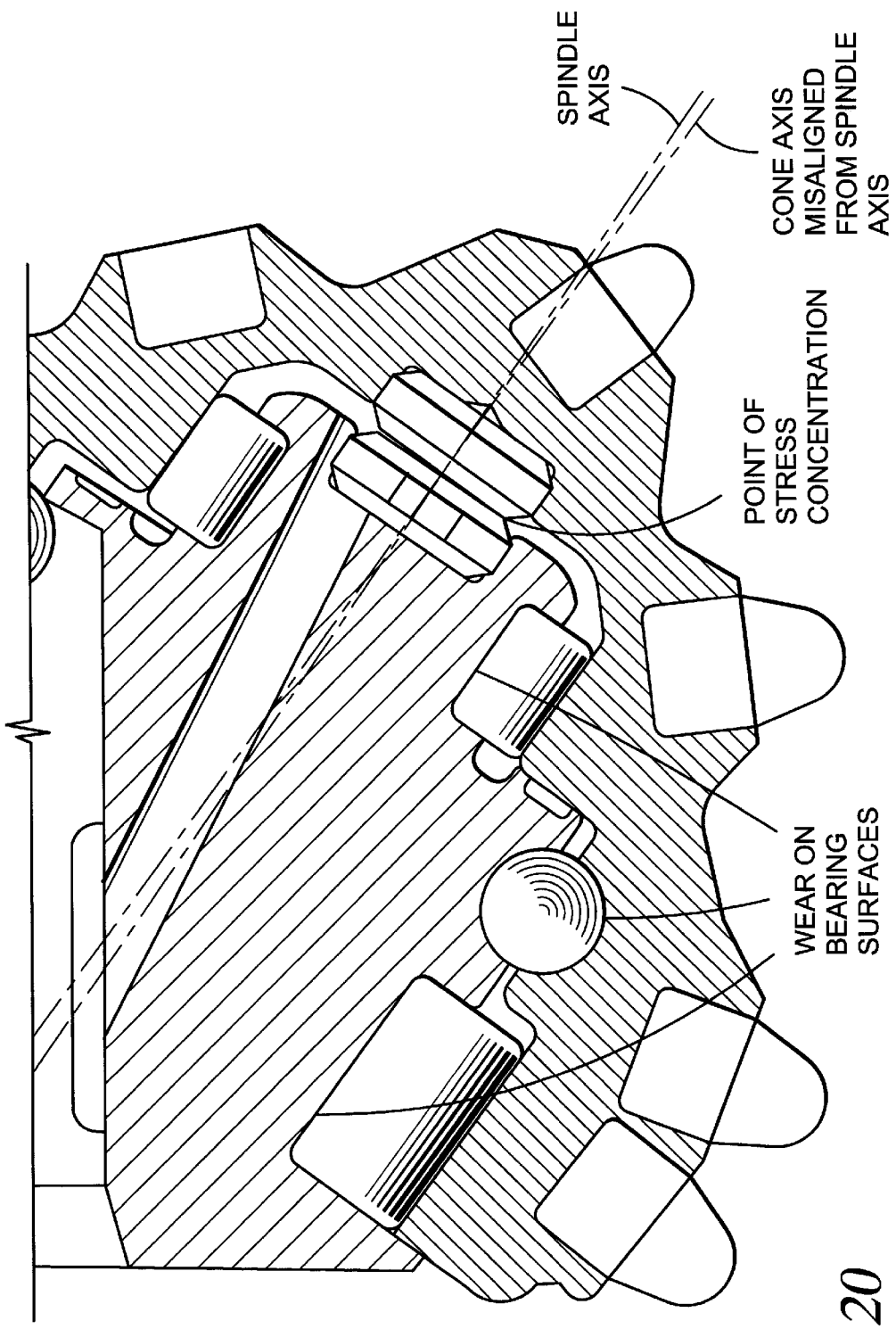
FIG. 20 is a cross-section of a rock bit leg, bearing and rotary cone showing how wear on the bearing components results in stress concentrations on the low side of the leg.

The configuration of the cooling passages according to the present invention allows cooling fluid to be directed to that portion of the thrust buttons that subject to the greatest stress without necessitating a fluid duct through the portion of the spindle that is likewise subject to the greatest stress. More specifically, as shown in FIG. 20, during operation of the bit, and particularly once some wear of the moving parts has occurred, stress resulting from the cutting load is concentrated on the low side of each cone and spindle and at the low side of the thrust bearing interface. The present invention allows cooling fluid to be directed onto the low side of the thrust bearing interface, without requiring a fluid duct through the low side of the spindle. According to the present invention, the low side of the thrust bearing interface can be cooled with fluid from a fluid duct that is axially located in the spindle, or even position on the high side of the spindle.

Another advantage of the present invention is that, by providing cone thrust button 350 with its own cooling channel, cooling of the cone thrust bearing 350 is no longer dependent on the temperature of the spindle thrust bearing. In addition, the cooling channels are removed from both wear faces 348, 358 and positioned on the back of each thrust button, which allows the temperature distribution within the thrust buttons to equilibrate and significantly reduces thermal fatigue within each disc. In addition, by positioning cooling channels on the back of each disc rather than on its wear face, the reduction in area caused by cooling channels is limited to the area of the central bore. This allows more surface area for distribution of the axial load and reduces the shear stresses that occur when one or more cooling channel is positioned on the wear face.

According to a preferred embodiment, the spindle thrust button is made of a somewhat softer material than in the cone thrust button. It has been found placement of the non-wearing member in the cone instead of in the spindle mitigates the adverse effects of the slight misalignment between the cone and spindle that can occur as a result of either the manufacturing process or wear on the components. This is because some of the stress concentration that is caused by the misalignment will be relieved as the wearing member deforms to the misaligned angle. Furthermore, it is preferred that both discs be made of materials having properties within a certain definitional range. Namely, it is preferred that the materials used for buttons 340 and 350 have hardnesses of at least 62 Rc, more preferably at least 65 Rc and still more preferably at least 70 Rc and fracture toughnesses of at least 8 MPa·m$^{1/2}$. Fracture toughness represents the ability of a material to resist crack propagation and is used to assess the ability of a hard material to absorb impact. Examples of materials that can be manufactured according to these specifications include, but are not limited to: cermets, base materials coated with certain wear-resistant coatings, and materials prepared using elemental diffusion techniques. Cermets are sintered materials that are a composite mixture of a ceramic and a metal. Suitable cermets include as the ceramic portion tungsten carbide, titanium carbide, tantalum carbide and mixtures thereof, in a binder of cobalt, nickel, molybdenum or combinations thereof. The bulk properties of cermets generally reflect properties of both the binder and the ceramic components. Desirable properties for the present invention include toughness, excellent thermal conductivity, and high resistance to thermal shock. Cermets in general are known in the art and the use of cermets contemplated herein is not limited to graphite-containing to the species described above.

In addition, cermets having a lubricant in the binder phase can be suitable for use in the thrust buttons of the present invention. For example, tungsten carbide can be processed with excess carbon in the powder mixture. Upon sintering, the carbon will assume its graphite phase. When used in a bearing application, the graphite present throughout the material acts as a solid lubricant by platelet shearing action. Lubricant-containing cermets are known in the art and the use of such cermets contemplated herein is not limited to graphite-containing tungsten carbide.

In place of cermets it may alternatively be desirable to use a relatively hard base material that is coated with a wear-resistant or friction-reducing coating. Examples of suitable base materials include steel, tool steel, and tungsten carbide, all of which can be processed so that they possess adequate toughness and strength to withstand the impact loads associated with drilling. Examples of suitable coatings include titanium nitride, chromium nitride, or tungsten carbide.

It may also be desirable to use as the material for the thrust buttons a material such as steel, tool steel, or tungsten carbide that has received a wear resistant surface treatment. Such surface treatments are known in the art, such as a pack cementation process, and work by diffusing into the surface of the material an elemental species such as boron, chromium, or nitrogen. According to the present invention, the resulting material has a hardness of at least 62 Rc, more preferably 65 Rc, and still more preferably 70 Rc. For example, in one preferred embodiment, the spindle thrust button is constructed of a tungsten carbide having an average grain size of 6 microns and a cobalt content of approximately 10% by volume, while the cone thrust button is constructed of a tungsten carbide having an average grain size of 5 microns and a cobalt content of approximately 10% by volume.

Applying the concepts discussed above with respect to the invention shown in FIGS. 1–10, the spindle and cone thrust buttons are preferably constructed so as to maximize the strength of the knurls on their periphery, while simultaneously providing relatively large air flow recesses as well as sufficient clearance adjacent each knurl to accommodate deformed material from the hoop. When a brittle material is interference fit into a steel socket, the teeth of the knurl must be strong enough to withstand the forces generated during the pressing process and the impact forces of normal drilling. A wide pitch spacing between knurls creates this type of engagement point and helps the engagement point withstand stress. In the past, it has been known to use polygonal thrust bearings having flat sides between the interference points. It has been found however, that as tooth spacing decreases, the flat sides do not allow sufficient clearance between the thrust bearing and the hoop to accommodate material deformed from the hoop. In addition, the interference points formed on a polygonal thrust button are relatively sharp, and therefore tend to be more susceptible to breakage.

Referring now to FIG. 21, a specific preferred construction for either or both of the thrust buttons of the present invention is shown. The preferred thrust button 600 includes knurls 610, valleys 620 and recesses 630 as described above. Each knurl 610 has a radius of curvature $r_1$, each valley 620 has a radius of curvature $r_2$, and each recessed portion 630 has a radius of curvature $r_3$. In addition, the pitch between adjacent knurls 610 is measured as $\alpha$, the angle between tangents of a valley 620 and an adjacent recess 630 is measured as $\beta$, and the angle between tangents of adjacent valleys 620 is measured as $\theta$. By increasing $r_3$, a larger fluid passage can be formed, but it is undesirable for this increase to come at the expense of the strength of the knurls. By way of illustration only, preferred values for each of these variables are given in Table I below, for various bit sizes. It will be understood that the values given below are illustrative only and are not intended to limit or quantify the present invention in any way.

TABLE I

| Dimension | BIT SIZE | | | |
|---|---|---|---|---|
| Knurl Count | 18 | 9 | 9 | 9 |
| $r_1$ | 0.047 in | 0.03 in | 0.04 in | 0.05 |
| $r_2$ | 0.047 in | 0.45 in | 0.63 in | 0.88 |
| $r_3$ | N/A | 1.3 in | 1.44 in | 2.75 |
| $\alpha$ | 20° | 30° | 30° | 30° |
| $\beta$ | N/A | 100° | 100° | 100° |
| $\theta$ | 92° | 118° | 118° | 118° |
| Diameter | 0.69 in | .92 in | 1.17 in | 1.54 in |
| Octagonal shape - tungsten carbide material (Prior Art) | | | | |
| | N/A | 9⅞ | 12¼ in | 16 in |
| Knurl Count | — | 8 | 8 | 8 |
| $r_1$ | — | Sharp | Sharp | Sharp |
| $r_2$ | N/A | N/A | N/A | N/A |
| $r_3$ | — | 0.50 in | 1.50 in | 3.00 in |
| $\alpha$ | — | 45° | 45° | 45° |
| $\beta$ | N/A | N/A | N/A | N/A |
| $\theta$ | — | 135° | 135° | 135° |
| Diameter | — | 0.92 in | 1.13 in | 1.54 in |
| Conventional Tool Steel Thrust Button - 25 teeth/inch, tool steel (Prior Art) | | | | |
| | 7⅞ in | 9⅞ in | 12¼ in | 16 in |
| Knurl Count | 54 | 72 | 89 | 121 |
| $r_1$ | Sharp | Sharp | Sharp | Sharp |
| $r_2$ | 0.01 in | 0.01 in | 0.01 in | 0.01 in |
| $r_3$ | N/A | N/A | N/A | N/A |
| $\alpha$ | 6.67° | 5.0° | 4.05° | 2.98° |
| $\beta$ | — | — | — | — |
| $\theta$ | 45° | 45° | 45 | 45° |
| Diameter | 0.69 in | 0.92 in | 1.13 in | 1.54 in |

It will be recognized that various modifications can be made in the design and operation of the present invention without departing from the spirit thereof. Thus, while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. A thrust bearing system for a rotary cone rock bit comprising at least one rotary cone retained on a spindle, said spindle including a fluid duct, comprising:
    a first thrust bearing comprising a disc having a wear face, a base face, and a knurled periphery, said periphery including at least one recessed portion that is in fluid communication with the fluid duct, said recessed portion allowing passage of fluid between said wear face and said base face.

2. The thrust bearing system according to claim 1 wherein said base face includes a first channel in fluid communication with the fluid duct, said channel exhausting fluid from said fluid duct to a cavity between the spindle and the cone.

3. A thrust bearing system for a rotary cone rock bit comprising at least one rotary cone retained on a spindle, said spindle including a fluid duct, comprising:
    a spindle thrust bearing comprising a disc having a wear face, a base face, and a knurled periphery, said periphery including at least one recessed portion that is in fluid communication with the fluid duct; and
    a cone thrust bearing comprising a disc having a wear face, a base face, and a knurled periphery, said cone thrust bearing periphery including a recessed portion, said recessed portion of said cone thrust bearing intermittently being in fluid communication with said recessed portion of said spindle thrust bearing during operation of the system.

4. The bearing system according to claim 3 wherein said cone thrust bearing includes a plurality of reduced-radius recessed portions, said recessed portions being non-aligned with said recessed portion of said spindle thrust bearing, such that as said cone thrust bearing rotates relative to said spindle thrust bearing, each recessed portion on said cone thrust bearing passes in and out of fluid communication with said fluid duct via said recessed portion of said spindle thrust bearing.

5. The bearing system according to claim 3, wherein said base face of said cone thrust bearing includes a first channel in fluid communication with said recessed portion of said cone thrust bearing and is adapted to engage a corresponding socket.

6. The bearing system according to claim 3, wherein said spindle thrust bearing is constructed of a material that is softer than the material from which said cone thrust bearing is constructed.

7. A thrust bearing system for a rotary cone rock bit comprising at least one rotary cone retained on a spindle, said spindle including a fluid duct, comprising:

a first thrust bearing comprising a disc having a wear face, a base face, and a knurled periphery, said periphery including at least one recessed portion that is in fluid communication with the fluid duct, said first thrust bearing further including a central bore therethrough, said central bore being also in fluid communication with the fluid duct.

8. The thrust bearing system according to claim 7 wherein said base face includes a first channel in fluid communication with the fluid duct, and said channel provides fluid communication between said central bore and said recessed portion.

9. The bearing system according to claim 8, further including a second thrust bearing comprising a disc having a wear face and a base face, a knurled periphery, and a central bore therethrough, said central bore of said second thrust bearing being in fluid communication with said central bore of said first thrust bearing, and said base face of said second thrust bearing including a second channel communicating between said central bore and said periphery of said second thrust bearing and being adapted to engage a corresponding socket.

10. The thrust bearing system according to claim 9 wherein said periphery of said second thrust bearing includes at least one recessed portion, and said second channel provides fluid communication between said central bore and said recessed portion of said second thrust bearing.

11. The thrust bearing system according to claim 10 wherein said recessed portion of said second thrust bearing is intermittently in fluid communication with said recessed portion of said first thrust bearing during operation of the system.

12. The bearing system according to claim 11 wherein said first thrust bearing is received in a socket in said spindle.

13. The bearing system according to claim 12 wherein said second thrust bearing is received in a socket in said cone.

14. The thrust bearing system of claim 10, wherein said spindle thrust bearing comprises a tungsten carbide having an average grain size of 6 microns and a cobalt content of approximately 10% by volume.

15. The thrust bearing system of claim 14, wherein said second thrust bearing comprises a tungsten carbide having an average grain size of 5 microns and a cobalt content of approximately 10% by volume.

16. A rotary cone bit, comprising:

a bit body including three legs extending therefrom and a cantilevered spindle extending from each of said legs;

a cone cutter received and rotatably retained on each of said spindles;

a first bearing system adapted to facilitate rotation of said cone with respect to said spindle; and a second bearing system adapted to transmit axial force from said cone to said spindle, said second bearing system comprising a spindle thrust bearing and a cone thrust bearing, each of said thrust bearings having a wear face and a back face, said spindle thrust bearing being mounted in said spindle and said cone thrust bearing being mounted in said cone such that said wear faces engage each other and transmit axial force therebetween;

wherein the material from which said spindle thrust bearing is constructed is selected from the group consisting of: cermets, ceramics, and base materials coated with wear resistant coatings, said material having a hardness of at least 62 Rc and a fracture toughness of at least 8 MPa·m$^{1/2}$; and wherein the material from which said cone thrust bearing is constructed is selected from the group consisting of: cermets, ceramics, and base materials coated with wear resistant coatings, said material having a hardness of at least 62 Rc and a fracture toughness of at least 8 MPa·m$^{1/2}$.

17. The bit according to claim 16 wherein said spindle thrust bearing and said cone thrust bearing are constructed of the same material.

18. The bit according to claim 16 wherein said spindle thrust bearing and said cone thrust bearing are constructed of different materials.

19. The bit according to claim 16 wherein one of said spindle thrust bearing and said cone thrust bearing comprises a cermet.

20. The bit according to claim 19 wherein both of said spindle thrust bearing and said cone thrust bearing comprise a cermet.

21. The bit according to claim 16 wherein one of said spindle thrust bearing and said cone thrust bearing comprises a cermet that includes a lubricant in its binder phase.

22. The bit according to claim 16 wherein one of said spindle thrust bearing and said cone thrust bearing comprises a base material coated with a wear resistant coating.

23. The bit according to claim 22 wherein both of said spindle thrust bearing and said cone thrust bearing comprise a base material coated with a wear resistant coating.

24. The bit according to claim 16 wherein one of said spindle thrust bearing and said cone thrust bearing comprises a base material treated with a wear resistant surface treatment comprising an elemental diffusion.

25. The bit according to claim 24 wherein both of said spindle thrust bearing and said cone thrust bearing comprise base material treated with a wear resistant surface treatment comprising an elemental diffusion.

26. A thrust bearing system for transmitting axial loads from the cone to the spindle in a rotary cone rock bit comprising at least one rotary cone retained on a spindle, comprising:

a spindle thrust bearing mounted in the spindle and comprising a disc having a wear face, a base face, and a knurled periphery; and a cone thrust bearing mounted in the cone and comprising a disc having a wear face, a base face, and a knurled periphery, wherein both of said spindle thrust bearing and said cone thrust bearing comprise a sintered material.

27. The bearing system according to claim 26 wherein both of said spindle thrust bearing and said cone thrust bearing comprise a cermet.

28. The bearing system according to claim 26 wherein both of said spindle thrust bearing and said cone thrust bearing comprise carbide.

29. The bearing system according to claim 26 wherein both of said spindle thrust bearing and said cone thrust bearing comprise a base material coated with a sintered coating having a hardness of at least 65 Rc.

30. A thrust bearing system for a rotary cone rock bit comprising at least one rotary cone retained on a spindle, said spindle including a fluid duct, comprising:
   a spindle thrust bearing comprising a disc having a wear face, a base face, and a periphery;
   a cone thrust bearing comprising a disc having a wear face, a base face, and a periphery;
   at least one of said spindle and cone thrust bearings including an interconnected series of fluid passages across its periphery and base face, said passages directing a fluid onto at least one of said base faces during operation of the bit.

31. A bit according to claim 30 wherein the fluid duct is axial and said fluid passages include aligned central boreholes through each of said thrust discs, through which the fluid flows to said back face of said cone thrust disc.

32. A bit according to claim 30 wherein the fluid duct is off-center and said fluid passages include a recess on the periphery of said cone thrust discs, through which the fluid flows to said back face of said cone thrust disc.

33. A bit according to claim 30 wherein said fluid passages include peripheral recesses on each of said thrust discs through which the fluid flows to said back face of said cone thrust disc, said recesses being intermittently aligned during operation of the bit.

34. A thrust bearing system for a rotary cone drill bit comprising at least one rotary cone retained on a spindle, said spindle including a fluid duct, comprising:
   a spindle thrust bearing comprising a disc having a wear face and a base face; and
   a cone thrust bearing comprising a disc having a wear face and a base face, said cone thrust bearing including a passage in fluid communication with the fluid duct and providing fluid contact with said base face of said cone thrust bearing.

35. The bearing system according to claim 34 wherein said cone thrust bearing passage include a portion that is defined by a recess in said base face of said cone thrust bearing.

* * * * *